United States Patent
Vance et al.

(10) Patent No.: US 9,644,379 B2
(45) Date of Patent: May 9, 2017

(54) ELEVATED PLATFORM SYSTEM INCLUDING RESTRAINING SYSTEMS AND VISION SYSTEM

(71) Applicant: The Boeing Company, Chicago, IL (US)

(72) Inventors: Jonathan B. Vance, St. Louis, MO (US); Steven A. Dorris, St. Peters, MO (US); Al Salour, St. Louis, MO (US); Douglas D. Trimble, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 260 days.

(21) Appl. No.: 14/170,501

(22) Filed: Jan. 31, 2014

(65) Prior Publication Data

US 2015/0122579 A1 May 7, 2015

Related U.S. Application Data

(60) Provisional application No. 61/899,969, filed on Nov. 5, 2013.

(51) Int. Cl.
| | |
|---|---|
| *E04G 5/00* | (2006.01) |
| *E04G 21/32* | (2006.01) |
| *G06K 7/00* | (2006.01) |
| *G06K 19/07* | (2006.01) |
| *A62B 35/00* | (2006.01) |
| *B66F 11/04* | (2006.01) |

(52) U.S. Cl.
CPC .............. *E04G 5/001* (2013.01); *A62B 35/00* (2013.01); *B66F 11/04* (2013.01); *E04G 21/3276* (2013.01); *E04G 21/3295* (2013.01); *G06K 7/0008* (2013.01); *G06K 19/07* (2013.01)

(58) Field of Classification Search
CPC . A62B 35/00; E04G 21/3292; E04G 21/3276; E04G 5/001; G06K 7/008; G06K 19/07
USPC ........................................................ 348/159
See application file for complete search history.

(56) References Cited

U.S. PATENT DOCUMENTS

| | | | |
|---|---|---|---|
| 5,001,557 A | 3/1991 | Begle | |
| 5,373,915 A | 12/1994 | Tremblay | |
| 6,265,983 B1 * | 7/2001 | Baillargeon | ....... A62B 35/0037 340/673 |
| 7,839,291 B1 | 11/2010 | Richards | |
| 2008/0021717 A1 | 1/2008 | Kaartinen et al. | |
| 2008/0021718 A1 | 1/2008 | Kaartinen et al. | |
| 2008/0021905 A1 | 1/2008 | Kaartinen et al. | |
| 2008/0100704 A1 * | 5/2008 | Venetianer | .......... G06F 17/3079 348/143 |

(Continued)

FOREIGN PATENT DOCUMENTS

| | | |
|---|---|---|
| CA | 2723613 A1 | 7/2010 |
| WO | 2013050849 A1 | 4/2013 |

*Primary Examiner* — Katherine Mitchell
*Assistant Examiner* — Marcus Menezes
(74) *Attorney, Agent, or Firm* — Miller, Matthias & Hull LLP (57) ABSTRACT

An elevated platform system comprises a platform, a vision system configured to detect a number of people on the platform, and a plurality of restraining systems onboard the platform. Each restraining system includes a passive RFID tag secured to the platform and a reader configured to perform near field detection of the tag.

15 Claims, 6 Drawing Sheets

(56) References Cited

U.S. PATENT DOCUMENTS

| | | | |
|---|---|---|---|
| 2009/0315678 A1* | 12/2009 | Padmanabhan | H04Q 9/00 340/10.1 |
| 2010/0026484 A1 | 2/2010 | King et al. | |
| 2010/0033575 A1* | 2/2010 | Lee | H04N 7/18 348/159 |
| 2010/0118149 A1* | 5/2010 | Levin | G06Q 10/06 348/169 |
| 2010/0219015 A1 | 9/2010 | Meillet | |
| 2010/0231402 A1* | 9/2010 | Flynt | G08B 19/00 340/679 |
| 2010/0271187 A1* | 10/2010 | Uysal | G06K 7/0008 340/10.4 |
| 2011/0227748 A1 | 9/2011 | Schaible et al. | |
| 2012/0081214 A1 | 4/2012 | Alan | |
| 2013/0057391 A1 | 3/2013 | Salvador et al. | |
| 2014/0353115 A1* | 12/2014 | Baitz | A47F 9/047 198/340 |
| 2015/0090527 A1 | 4/2015 | Salour et al. | |

\* cited by examiner

ELEVATED PLATFORM SYSTEM INCLUDING RESTRAINING SYSTEMS AND VISION SYSTEM

BACKGROUND

Elevated platforms may be equipped with safety harnesses and other fall restraints to ensure the safety of personnel working at elevated conditions. These personnel are usually responsible for securing their fall restraints. They are at risk if their fall restraints are not working properly, if they choose not to utilize their fall restraints, or if they forget to utilize their fall restraints.

Visual inspections may be performed to ensure that the fall restraints are working properly and that they are being utilized. However, visual inspections have limited value.

SUMMARY

According to an embodiment herein, an elevated platform system comprises a platform, a vision system configured to detect a number of people on the platform, and a plurality of restraining systems onboard the platform. Each restraining system includes a passive RFID tag secured to the platform and a reader configured to perform near field detection of the tag.

According to another embodiment herein, a fall restraint system for an elevated platform comprises a vision system configured to detect people onboard the platform, a restraint onboard the platform, an RFID tag secured to the platform, and a passive RFID reader, carried by the restraint, for performing near field RFID detection of the tag.

According to another embodiment herein, a method comprises using a vision system to detect a number of people on a platform, using near field RFID detection to determine whether a number of restraints on the platform are secured to the platform, and comparing the number of detected people to the number of secured restraints.

These features and functions may be achieved independently in various embodiments or may be combined in other embodiments. Further details of the embodiments can be seen with reference to the following description and drawings.

DETAILED DESCRIPTION

Figure 1:
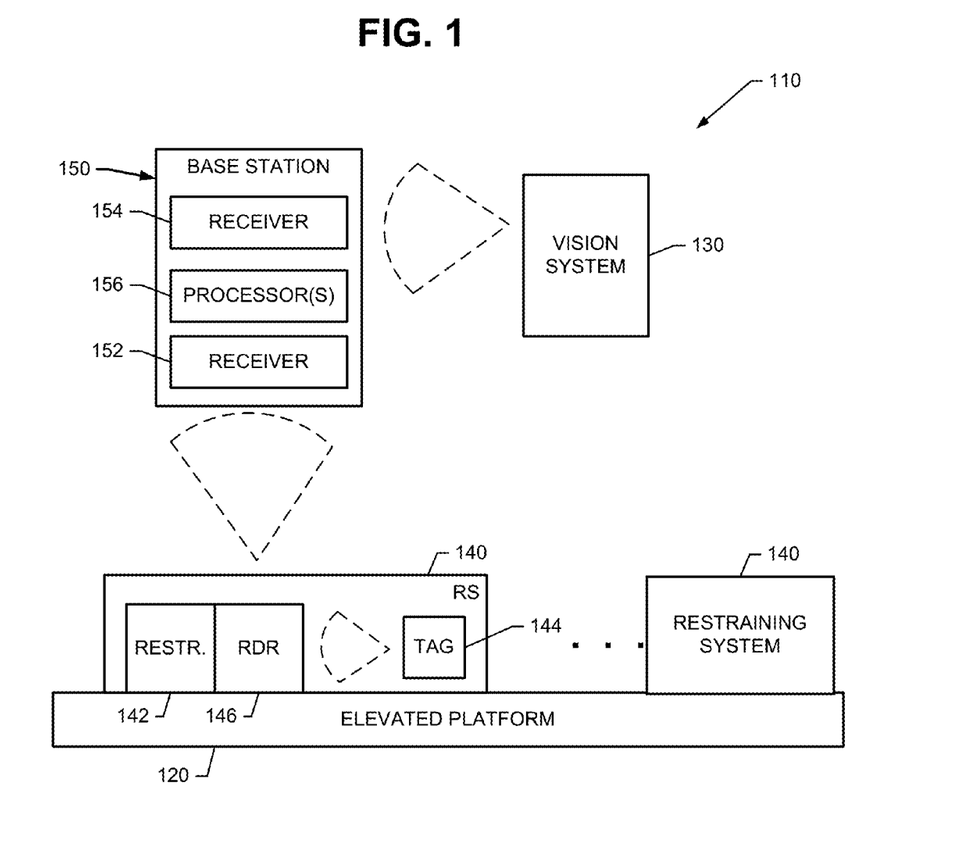
FIG. 1 is an illustration of an elevated platform system.

Reference is made to FIG. 1, which illustrates an elevated platform system 110 including an elevated platform 120. An elevated platform 120 such as catwalk or scaffolding (or even a beam of a bridge or building under construction) may have a fixed height, whereas an elevated platform 120 such as a lift platform may be raised and lowered by a lift assembly (e.g., scissor lift, boom lift). A lift platform may include a control unit operable for changing its elevation.

Figure 2:
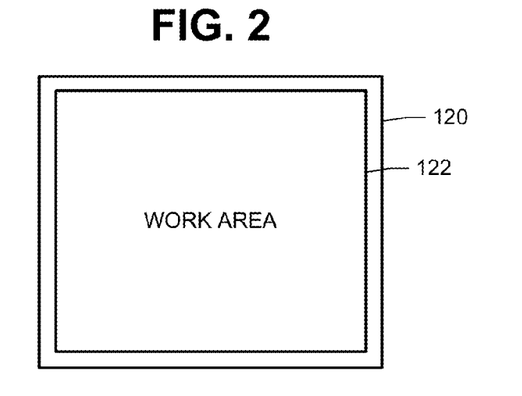
FIG. 2 is an illustration of an elevated platform.

Additional reference is made to FIG. 2. The platform 120 has a work area 122. Workers will move about this work area 122 as they perform their work-related tasks.

The elevated platform system 110 further includes a vision system 130 configured to detect a number of people onboard the platform 120. The vision system 130 may include at least one camera stationed above the platform 120 for capturing images of the work area 122. Each camera may capture images of the platform 120 as the platform 120 is being raised, lowered or otherwise moved. More than one camera may be used if line-of-sight issues arise for a single camera, or if the single camera cannot capture the entire work area 122.

In some configurations of the elevated platform system 110, the vision system 130 sends the captured images to a remote entity, which processes the captured images to determine the number of people onboard the platform 120. In other configurations, the vision system 130 processes the captured images to determine the number of people onboard the platform 120. The image processing may be performed, for example, by a processor programmed with stereo computer vision software that detects torsos and heads of people in a volume of space above the floor and below a set height. Detection of distinct people then leads to an effective count of personnel onboard the platform 120.

At certain times, the number of people onboard the platform 120 may change. For instance, prior to raising the platform 120, people may step onto or off of the platform 120. The images are captured and processed at a rate that ensures an accurate count of people on the platform 120.

In still other configurations of the elevated platform system 110, the vision system 130 may send captured images to video displays. People may monitor the displayed images to identify the number of people onboard the platform 120.

The elevated platform system 110 further includes a plurality of restraining systems 140 onboard the elevated platform 120. Each restraining system 140 is configured to arrest a fall from the elevated platform 120. Each restraining system 140 includes a restraint 142 (e.g., a safety harness and lanyard), a passive RFID tag 144 secured to the platform 120, and a reader 146 carried by the restraint 142. The reader 146 is configured to perform near field detection of the tag 144. Examples of the restraining system 140 will be described below.

Figure 3:
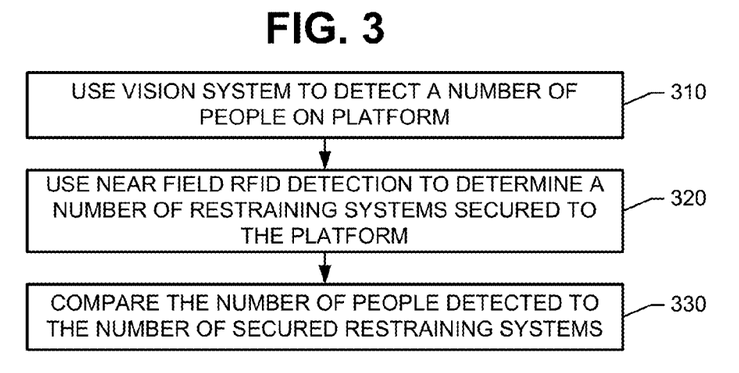
FIG. 3 is a method of operating the elevated platform system of FIG. 1.

Additional reference is made to FIG. 3, which illustrates the operation of the elevated platform system 110. At block 310, the vision system 130 is used to detect a number of people on a platform 120.

At block 320, near field RFID detection is used to determine a number of the restraining systems 140 that are secured to the platform 120. When an RFID tag 144 is detected by a reader 146, it is assumed that the associated restraining system 140 is secured to the platform 120.

At block 330, the number of detected people is compared to the number of secured restraining systems 140. If the numbers match, it is assumed that all people onboard the platform 120 are secured to the platform 120.

Reference is once again made to FIG. 1. The elevated platform system 110 further includes a base station 150 configured to communicate with the readers to determine a number of RFID tags 144 that are detected by their readers 146. The base station 150 may include a receiver 152 for communicating wirelessly with the readers 146. The wireless communication isn't limited to any particular protocol. Examples of such protocols include, but are not limited to, 802.3 Ethernet protocol, a WiFi protocol, a Bluetooth protocol, and a ZigBee® protocol.

The base station further includes a receiver 154 for communicating with the vision system 130. The receivers 152 and 154 may use the same wireless protocol or they may use different protocols. Bandwidth and the type of communications technology will depend upon whether the vision system 130 sends captured images to the base station 150 or simply sends messages indicating the number of people detected onboard the platform 120.

The base station 150 also includes one or more processors 156. In those configurations where the vision system 130 sends captured images to the base station 150, one or more of the processors 156 are programmed to process the images to detect the number of people in the work area 122.

Thus, the vision system 120 is said to be "configured to detect a number of people on the platform" either by (a) capturing images of the platform 120 and sending those images to the base station 150 or other remote entity for processing to detect the number of people on the platform 120; or (b) capturing images of the platform 120 and processing the captured images to detect the number of people on the platform 120.

The base station 150 may be configured to compare the number of detected RFID tags to the number of people detected on the platform. A processor 156 may be programmed to perform this function.

The base station 150 may be further configured to take action if the number of detected people does not match the number of number of detected RFID tags. For example, if the platform 120 includes a lift mechanism, the base station 150 may be configured to enable operation of the lift mechanism when the number of detected people matches the number of number of detected RFID tags. If the numbers don't match, the base station 150 may be configured to lock out the lift mechanism or otherwise lock out the operation of the platform 120. Other actions may include sounding an alarm or generating a notification in the event the numbers don't match.

Although FIG. 1 shows a single elevated platform 120, the elevated platform system 110 is not limited to a single platform 120. The elevated platform system 110 may include at least one additional platform 120. Each additional platform 120 may carry a plurality of additional restraining systems 140. The vision system 130 is configured to detect a number of people on each additional platform 120. The base station 150 is configured to communicate with the readers 146 of the additional restraining systems 140 to determine a number of RFID tags 144 detected on each additional platform 120. The base station is further configured to compare the number of detected people to the number of detected RFID tags 144 for each additional platform 120.

Figure 4:
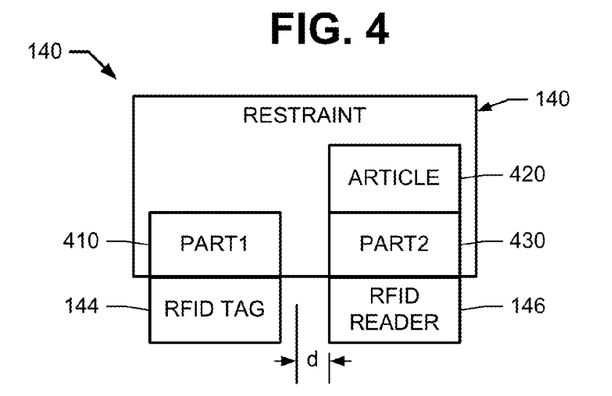
FIG. 4 is an illustration of a restraining system including a restraint, an RFID tag, and an RFID reader.

Reference is now made to FIG. 4, which illustrates an example of a restraining system 140 including a restraint 142. The restraint 142 of FIG. 4 includes a first interlockable part 410 secured to the platform. The RFID tag 144 is carried by the first interlockable part 410. In some configurations, the restraint 142 may further include a tether, lanyard or other device for securing the first interlockable part 410 to the platform. For example, the first part 410 may be secured to the free end of a lanyard, whose other end is secured to the platform. In other configurations, the first part 410 may be secured directly to the platform.

The restraint 142 of FIG. 4 further includes an article 420 such as a safety harness. The article 420 carries the passive RFID reader 146 and a second interlockable part 430. When the second interlockable part 430 is interlocked with the first part 410, the restraint 142 is restrained to the platform.

The reader 146 detects the passive RFID tag 144 only when the first and second parts 410 and 430 are interlocked. The tag 144 and the reader 146 are near-field in that radio frequency identification is performed within a prescribed detection range of just a few inches. As an example, the distance (d) equals about three to six inches (in other examples, the lower bound may be less than three inches, and/or the upper bound may be greater than six inches). If the RFID tag 144 (and, therefore, the first part 410) is within the prescribed range, it is detected by the reader 146. If the tag 144 is detected, the first part 410 is assumed to be interlocked with the second part 430.

Detection of the RFID tag 144 continues after the parts 410 and 430 have been interlocked. Once the RFID tag 144 is not detected, it is assumed that the parts 410 and 430 are not interlocked.

In some configurations of the restraining system 140, the entire reader 146 may be located next to the second part 430. In other configurations, only an antenna of the RFID reader 146 is located next to the second part 430. In still other embodiments, the second part 430 functions as the antenna of the RFID reader 146.

Figure 5:
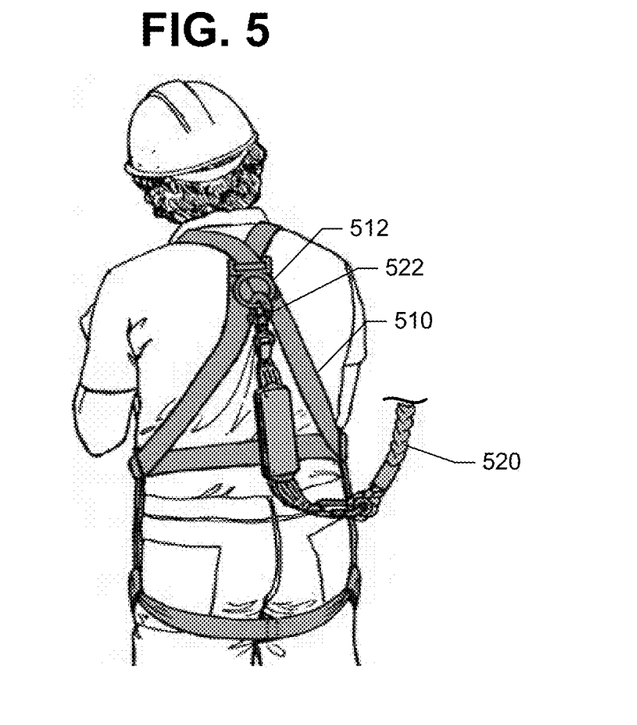
FIG. 5 is an illustration of a restraint for the restraining system of FIG. 4.

FIG. 5 is an illustration of an example of a restraint 142 for the restraining system 140 of FIG. 4. The restraint includes a safety harness 510 (the article 420) having a ring 512 (the second interlockable part 430), and a lanyard 520 having a free end that terminates in a snap hook 522 (the first interlockable part 410). The passive RFID tag 144 (not shown in FIG. 5) may be attached (e.g., epoxied) to the snap hook 522. The reader 146 (not shown in FIG. 5) may be carried by the safety harness 510, within a few inches of the ring 512. In some configurations, the safety harness 510 may be worn over a suit, and the reader 130 is secured to the suit, proximate the ring 512. The reader 146 detects the RFID tag 144 when the snap hook 522 is interlocked with the ring 512. When the snap hook 522 and the D-ring 512 are interlocked, motion of a person wearing the safety harness 510 is restrained to the platform.

Figure 6:
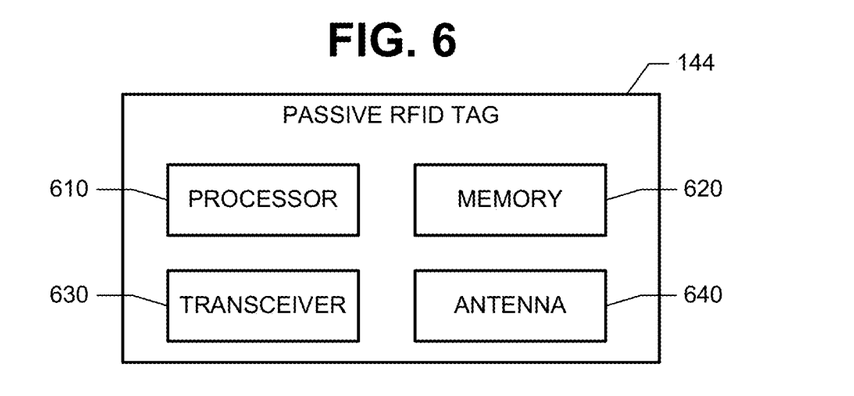
FIG. 6 is an illustration of a passive RFID tag for the restraining system of FIG. 4.

Reference is now made to FIG. 6, which illustrates an example of the passive RFID tag 144. The RFID tag 144 includes a processor 610, machine-readable memory 620, transceiver 630, and antenna 640. Operating power for the tag 144 may be harvested from the reader 146 or other external source (via, for example, RF backscatter activation). In some embodiments, however, the operating power may be provided by a battery or other internal source.

The memory 620 contains executable code for causing the tag 120 to respond to interrogations by the reader 146. When the tag 144 is interrogated by the reader 146, it may simply emit a wireless signal in periodic bursts, which bursts are referred to as "blink transmissions." Information encoded in the blink transmissions may include a unique identifier, such as an identifier corresponding to the restraining system 140.

Figure 7:
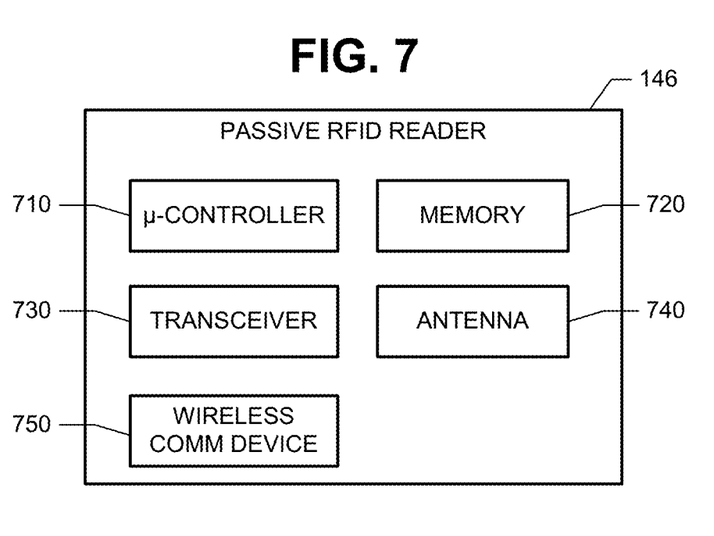
FIG. 7 is an illustration of a reader for the restraining system of FIG. 4.

Reference is now made to FIG. 7, which illustrates an example of an RFID reader 146 for the restraining system of FIG. 4. The reader 146 includes a processor such as an embedded microcontroller 710, machine-readable memory 720, a transceiver 730, and an antenna 740. The reader 146 may be battery-powered.

The antenna 640 of the tag 144 and the antenna 740 of the reader 146 may be configured to communicate regardless of relative orientation of the tag 144 and the reader 146.

The memory 720 stores executable code for programming the microcontroller 710. The microcontroller 710 causes the transceiver 730 and antenna 720 to interrogate the RFID tag 144. The reader 146 sets the transmit power and adjusts gain to perform near field detection within the prescribed range.

The platform carries multiple restraining systems 140; therefore, the platform carries multiple RFID tags 144 and multiple RFID readers 146. A reader 146 operating at a detection range of only a few inches is not likely to detect RFID tags 144 of other nearby restraining systems 140. Moreover, the detection ranges of the multiple readers 146 are likely not to overlap.

Figure 8:
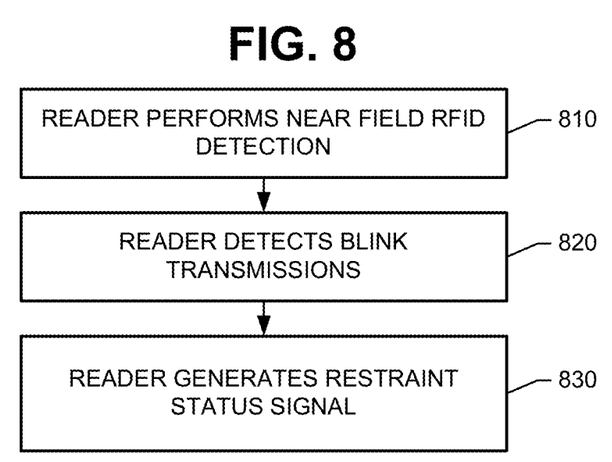
FIG. 8 is an illustration of a method of determining whether the restraining system of FIG. 4 is secured to a platform.

Additional reference is made to FIG. 8. When the RFID tag 144 is within a prescribed distance of the receiver 146, interrogations by the reader 146 cause the tag 144 to emit blink transmissions (block 810). The antenna 740 and the transceiver 730 of the reader 146 detect blink transmissions from the tag 146 (block 820).

The microcontroller 710 generates a restraint status signal indicating whether the reader detects the RFID tag (block 830). While blink transmissions are being received, signal indicates that the first and second parts are interlocked. Once the blink transmissions are no longer detected, the signal indicates that the parts are no longer interlocked.

In this manner, each restraining system 140 detects a non-interlocking condition without the need for visual inspection or the use of mechanical devices such as switches. The detection of a non-interlocking condition is non-contact and, therefore, is not subject to mechanical wear or failure. The restraining system 140 is more difficult to bypass or otherwise fool than mechanical devices.

The reader 146 further includes a wireless communications device 750 for communicating with the base station. The device 750 may transmit the restraint status signal to a base station upon request. The device 750 allows the base station to read the restraint status signals of all devices onboard the platform and thereby determine the number of secured restraining systems.

In some configurations of the reader 146, the device 750 may include a ZigBee® radio and XBee UART for transforming the restraint status signal to a ZigBee® format, whereby the base station can directly read the transformed RFID signal via the ZigBee® protocol. ZigBee® technology is advantageous for its availability in off-the-shelf modules, its easy integration, and its low power The use of the vision system offers advantages other than detecting whether the all restraining systems onboard the platform are being properly utilized. The base station may use the vision system to report in real time the number of workers on each elevated platform. This information may be used to determine whether each elevated platform is overcrowded. This information may also be used by the base station and/or lift controller to control the rate of descent and ascent of each elevated platform.

One particular application for the elevated platform system 110 is the painting of an aircraft. A commercial aircraft may be painted in a paint hanger equipped with a number of moveable elevated platforms 120 known in the industry as "crane stackers."

Figure 9:
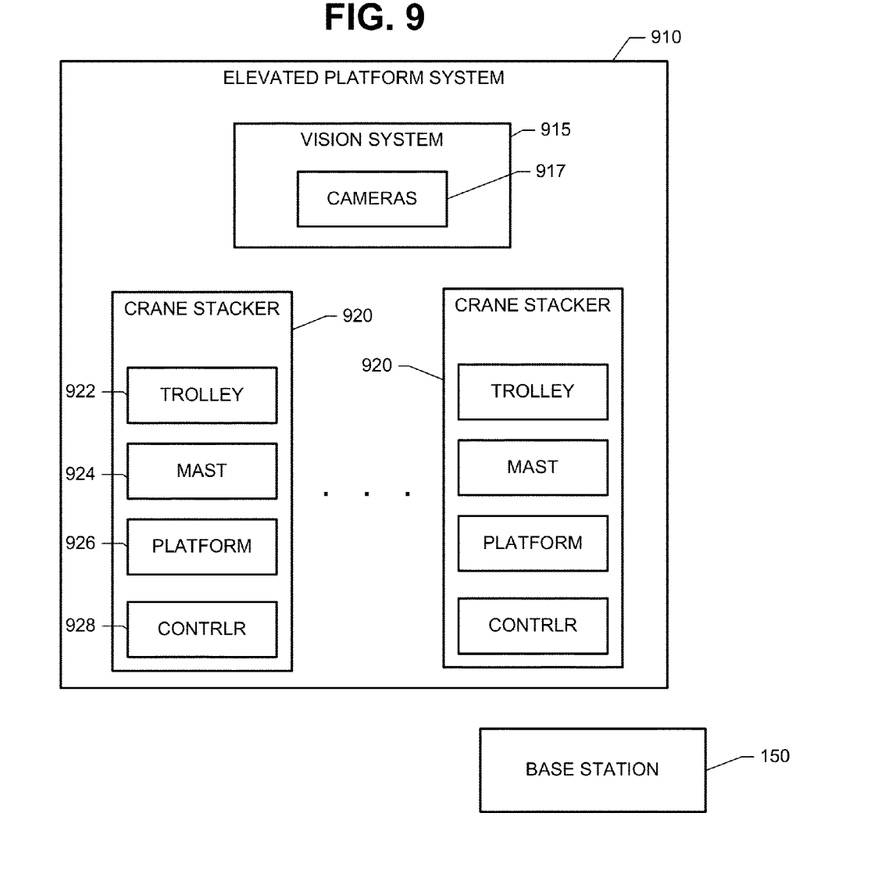
FIG. 9 is an illustration of an elevated platform system including a plurality of crane stackers.

Reference to FIG. 9, which illustrates an elevated platform system 910 including a vision system 915 and a plurality of crane stackers 920. Each crane stacker 920 may include a trolley 922, mast 924, platform 926, and controller 928. The trolley 922 is moveable along an overhead bridge.

The elevated platform system 910 further includes a base station 150 for communicating with the controllers 928 of the crane stackers 920 to position the platforms 926 around an aircraft and also to control the elevation of each platform 926.

The platform 926 of each crane stacker 920 includes a plurality of restraining systems 140 of FIG. 4. The restraint 420 of each restraining system 140 may include a safety harness and lanyard.

In some instances, a platform 926 can turn to one side or another, potentially impeding line of sight between the vision system 915 and the platform 926. In other instances, a platform 926 may be moved underneath a wing or part of the fuselage, potentially impeding the line of sight. To overcome these visibility issues, the vision system 915 may include multiple cameras 917.

Figure 10:
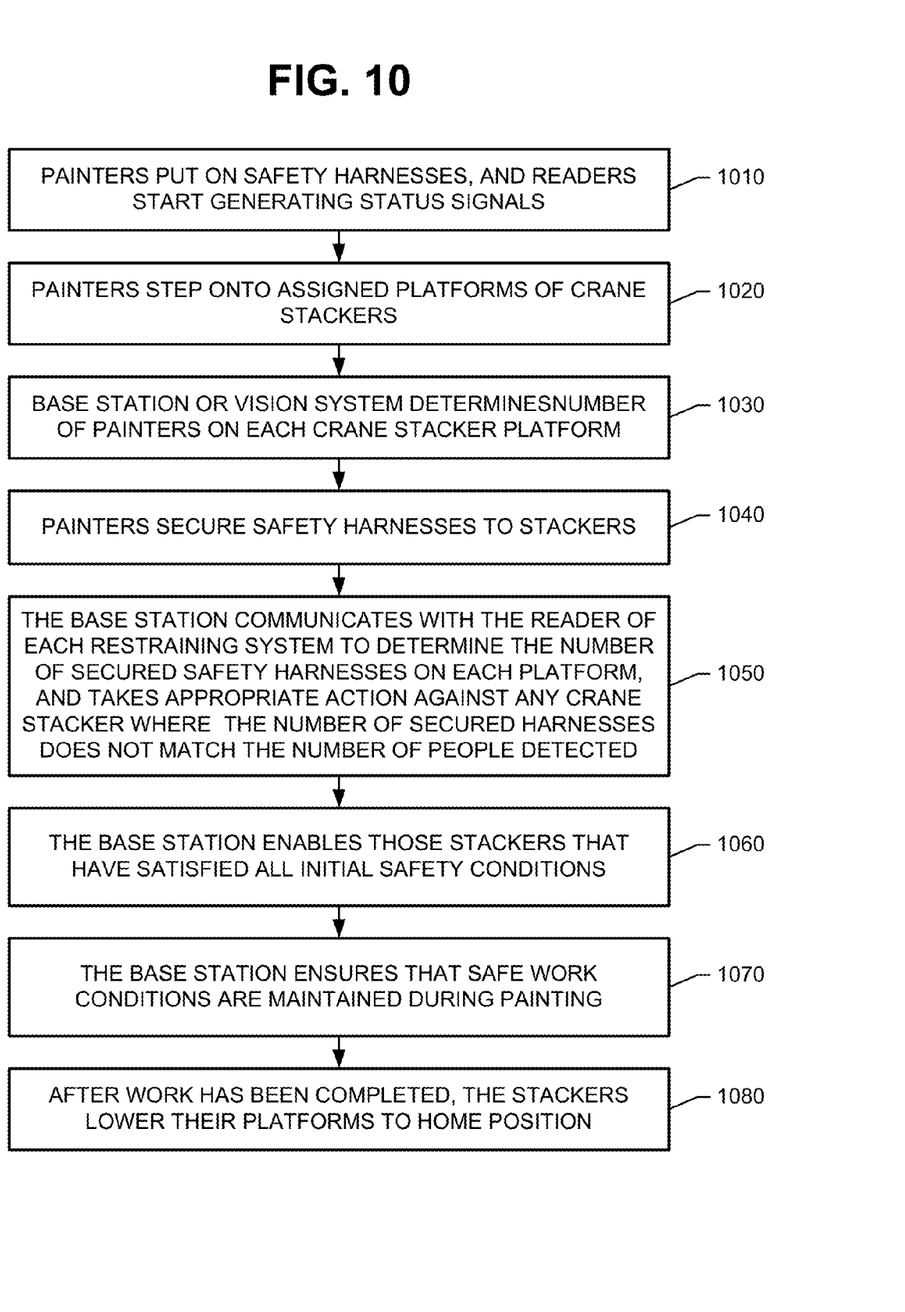
FIG. 10 is an illustration of a method of using the elevated platform system of FIG. 9 to paint an aircraft.

FIG. 10 is an illustration of a method of using the elevated platform system 910 of FIG. 9 to paint an aircraft. At block 1010, each painter puts on a safety harness. As a safety harness is put on, the reader that it carries starts continuously generating a restraint status signal.

At block 1020, the painters step onto their assigned crane stackers 920. At block 1030, the vision system 915 or the base station 150 determines the number of painters on the platform 926 of each crane stacker 920. In addition, the base station 150 may determine whether the crane stackers 920 are correctly populated.

At block 1040, the painters secure their safety harnesses to the crane stackers 920 by attaching their safety harnesses to free ends of lanyards. Those readers detecting the RFID passive tags will update their status signals to indicate that their restraining systems 140 are secured to the platform 926.

At block 1050, the base station 150 communicates with the reader 146 of each restraining system 140 to determine the number of secured safety harnesses on each platform 926. If the number of secured harness on the platform 926 of a given stacker 920 does not match the number of people detected on that platform 920, the base station 150 may immediately direct appropriate actions to that stacker 920.

At block 1060, the base station 150 communicates with the stacker controllers 928 and enables those crane stackers 920 that have satisfied all initial safety conditions. Each enabled crane stacker 920 can controls its lift mechanism to position its platform 926 with respect to the aircraft.

At block 1070, as the aircraft is being painted, the base station 150 continually reads the restraint status signals to ensure that safe work conditions are being maintained. For instance, the base station 150 ensures that none of the painters detaches their safety harness from a lanyard. If a safety harness is detached, the base station 150 may lock out movement of the crane stacker 920 until the painter reconnects with a lanyard.

At block 1080, after work has been completed, the crane stackers 920 move their platforms 926 to a home position. The painters detach their safety harnesses from the lanyards, step off the platforms 926, and return their safety harnesses to storage.

The invention claimed is:

1. A elevated platform system comprising:
   a platform;
   a vision system including at least one camera that captures images of the platform, the images used to determine a number of people on the platform;
   a plurality of restraining systems onboard the platform, each restraining system including a passive RFID tag secured to the platform and a reader secured to a worker's safety harness, the reader configured to perform near field detection of the tag when the passive RFID tag is proximate the reader; and a base station that communicates with each reader and the vision system and compares the number of people on the platform determined by the vision system to a number of tags detected from each reader.

2. The elevated platform system of claim 1, wherein the at least one camera of the vision system is stationed above the platform to capture images of a work area of the platform.

3. The elevated platform system of claim 1, wherein the vision system further includes a processor that processes the captured images to determine the number of people onboard the platform.

4. The elevated platform system of claim 1, wherein the base station is further configured to raise an alarm if the number of people on the platform determined by the vision system does not match the number of detected RFID tags.

5. The elevated platform system of claim 1, wherein the platform includes a lift mechanism, and wherein the base station is configured to enable operation of the lift mechanism when the number of people on the platform determined by the vision system matches the number of detected RFID tags.

6. The elevated platform system of claim 1, further comprising at least one additional platform and a plurality of additional restraining systems onboard each additional platform, the vision system configured to detect a number of people on each additional platform, the base station configured to communicate with the readers of the additional restraining systems to determine a number of RFID tags detected on each additional platform, the base station further configured to compare the number of people on the platform determined by the vision system to the number of detected tags for each additional platform.

7. The elevated platform system of claim 1, wherein each restraining system includes a restraint having:

a first interlockable part secured to the platform, the RFID tag carried by the first interlockable part; and an article that carries the reader and that has a second interlockable part that, when interlocked with the first part, restrains the article to the platform;

wherein the reader detects the RFID tag when the first and second parts are interlocked.

8. The elevated platform system of claim 7, wherein the reader performs near field detection within a prescribed range of a few inches of the second part.

9. The elevated platform system of claim 7, wherein the reader continues the near field detection after the parts have been interlocked.

10. The elevated platform system of claim 7, wherein the restraint further includes a lanyard having a free end that terminates in the first part; and wherein the article includes a safety harness.

11. The elevated platform system of claim 1, wherein the reader includes a processor programmed to generate a restraint status signal indicating whether the reader detects the RFID tag.

12. The elevated platform system of claim 11, wherein the reader further includes a wireless device for transmitting the restraint status signal to the base station.

13. The elevated platform system of claim 1, further comprising a crane stacker including the platform.

14. A fall restraint system for an elevated platform, the fall restraint system comprising:

a vision system including at least one camera that captures images used to determine a number of people onboard the platform;

a restraint onboard the platform;

an RFID tag secured to the platform;

a passive RFID reader, carried by the restraint, for performing near field RFID detection of the tag; and a base station that communicates with the passive RFID reader and the vision system and matches the number of people on the platform determined by the vision system to a number of tags detected by the passive RFID reader.

15. The system of claim 14, wherein the restraint includes a lanyard having a first part, and a harness having a second part that is interlockable with the first part, the reader proximate the second part, the RFID tag attached to the first part.

* * * * *